(12) United States Patent
Schmit et al.

(10) Patent No.: US 9,746,315 B1
(45) Date of Patent: Aug. 29, 2017

(54) SIDE ILLUMINATION IN INTERFEROMETRY

(71) Applicants: Joanna Schmit, Tucson, AZ (US); Son Hoang Bui, Tucson, AZ (US); Dong Chen, Tucscon, AZ (US); Matthew Jarrod Novak, Tucson, AZ (US)

(72) Inventors: Joanna Schmit, Tucson, AZ (US); Son Hoang Bui, Tucson, AZ (US); Dong Chen, Tucscon, AZ (US); Matthew Jarrod Novak, Tucson, AZ (US)

(73) Assignee: BRUKER NANO INC., Santa Barbara, CA (US)

( * ) Notice: Subject to any disclaimer, the term of this patent is extended or adjusted under 35 U.S.C. 154(b) by 235 days.

(21) Appl. No.: 14/733,092

(22) Filed: Jun. 8, 2015

Related U.S. Application Data (63) Continuation-in-part of application No. 14/293,662, filed on Jun. 2, 2014, now Pat. No. 9,282,304, and a continuation-in-part of application No. 14/294,038, filed on Jun. 2, 2014, now abandoned.

(60) Provisional application No. 62/153,907, filed on Apr. 28, 2015.

(51) Int. Cl.
*G01B 9/02* (2006.01)
*G01B 11/24* (2006.01)

(52) U.S. Cl.
CPC ................. *G01B 11/2441* (2013.01)

(58) Field of Classification Search
CPC ............ G01B 11/2441; G01B 9/02001; G01B 9/02029; G01B 9/0203
USPC .......................................... 356/489, 495, 511
See application file for complete search history.

(56) References Cited

U.S. PATENT DOCUMENTS

| | | | |
|---|---|---|---|
| 2003/0048540 A1* | 3/2003 | Xie ........................ | A61B 3/102 359/637 |
| 2014/0226150 A1* | 8/2014 | Colonna de Lega .................. | G01B 9/02007 356/73 |

OTHER PUBLICATIONS

Fay, Martin et al., "Measuring High-Slope and Super-Smooth Optics With High-Dynamic-Range Coherence Scanning Interferometry"; Classical Optics 2014.
(Continued)

*Primary Examiner* — Jonathan Hansen
(74) *Attorney, Agent, or Firm* — Antonio R. Durando (57) ABSTRACT

Side illumination is combined with scanning interferometry to provide a means for measuring with a single data-acquisition scan surfaces that contain sections suitable for interferometric processing as well as sections that are not suitable because of lack of fringes produced by the measurement. In the sections where no fringes are produced, the irradiance detected during the scan is processed using a depth-from-focus mapping method to yield a corresponding measurement. The result is a complete profilometric measurement of the sample surface with a single scan. In addition, by increasing sample irradiance through side illumination, the structural features of the sample become markedly more visible than when illuminated only by the object beam of the interferometer, which greatly facilitates finding focus and identifying regions of interest for the measurement.

8 Claims, 7 Drawing Sheets

(56) References Cited

OTHER PUBLICATIONS

Fay, Martin et al., "Measuring High-Slope Parts Using Coherence Scanning Interferometry"; Classical Optics 2014.
Joanna Schmit et al., "High Precision Interferometric Shape Measurement of Objects With Areas of Different Reflectance"; SPIE Proceedings, vol. 4275 (2001).

* cited by examiner

SIDE ILLUMINATION IN INTERFEROMETRY

RELATED APPLICATIONS

This application is based on and claims the priority of U.S. Provisional No. 62/153,907, filed Apr. 28, 2015, and is a continuation-in-part application of U.S. Ser. No. 14/293,662, filed Jun. 2, 2014, and of U.S. Ser. No. 14/294,038, also filed Jun. 2, 2014, both hereby incorporated by reference.

BACKGROUND OF THE INVENTION

Field of the Invention

The invention relates in general to surface metrology. In particular, it relates to a combination of interferometric and so-called depth-from-focus data processing with side illumination added to conventional scanning interferometers.

Description of the Related Art

Interferometric techniques for surface profilometry (such as vertical-scanning and phase-shift interferometric methods) are well known in the art. They are particularly suitable for measuring smooth surfaces with relatively low slopes. When a high slope is encountered, interferometric fringes are weak or are not produced at all because the light is scattered away from the objective and no useful data are acquired. This problem has been addressed in scanning interferometry by rotating the sample between measurements to ensure that the slope of the surface being measured is such that enough light is returned to the objective to produce fringes at all times; the measurements are then stitched together in some manner to yield the complete profile of the surface. This approach requires very precise sample manipulation and data processing is complicated by the need to align each set of measurements for stitching purposes.

Another approach has been to provide an instrument with multiple-level illumination capability in order to increase the irradiance to the sample when higher slopes are measured (and vice-versa when the slope decreases) or when low-reflective samples are measured. See, for example, J. Schmit and A. Harasaki, "High precision shape measurement of objects with areas of different reflectance," Procedings SPIE 4275, 85-93 (2001); and Martin Fay et al., "Measuring High-Slope and Super-Smooth Optics with High-Dynamic-Range Coherence Scanning Interferometry," Optical Fabrication and Testing (OFT) 2014, OSA Technical Digest (online). However, this approach is necessarily affected by detector saturation limitations at the higher intensity modes of operation and it is still limited in the degree to which fringes can be obtained at very high slopes, especially when dealing with smooth surfaces.

A similar fringe deficiency is experienced even at lower slopes when the sample surface is rough and the light is not reflected toward the objective in sufficient quantity to provide visible interference fringes. This problem is accentuated by the relatively small objective aperture necessarily required for interferometric profilometry. Therefore, the task of measuring rough and/or high-slope sections of samples otherwise suitable for scanning interferometric measurements has been problematic in the art.

When the sample surface includes areas that cannot be measured interferometrically in their entirety on account of their slope or roughness, other, often irradiance-based, techniques have been utilized to fill in the gaps. One such method, for example, is the one commonly referred to in the art by the term contrast, referring to the fact that the surface is measured by finding the position of maximum contrast in the sample image (which corresponds to the best focus) produced by imaging through a conventional objective. Because of the normally higher numerical apertures used with conventional objectives, contrast methods produce results even when light scattering results from high slopes and/or from high surface roughness. Side illumination is sometimes added to such conventional (non-interferometric) objectives to increase irradiance to the sample, especially for higher slopes of both smooth and rough surfaces. The downside is that such non-interferometric methods are less accurate and are not suitable for measuring smooth surfaces because the exact focal position is hard to establish due to the lack of detectable features in the visible image of the sample.

Co-owned patent application Ser. No. 14/293,662 and Ser. No. 14/294,038 describe the use of side illumination for the purpose of enhancing color images generated from surfaces having low reflectivity. However, continued developments in the technologies covered by these patent applications has resulted in the discovery of heretofore unrecognized, significant, additional advantages of side illumination if combined with scanning interferometers. As described below, these advantages go a long way in overcoming the deficiencies outlined above with respect to measuring high-slope and rough surfaces.

BRIEF SUMMARY OF THE INVENTION

The invention lies in the recognition that side illumination combined with scanning interferometry provides a means for measuring with a single data-acquisition scan surfaces that contain sections suitable for interferometric processing as well as sections that are not suitable because of the lack of fringes produced by the measurement. Because the irradiance provided by side illumination does not interfere with the interferometric beams of interferometers in Michelson or Linnik or Twyman-Green configurations, for example, the correlograms acquired during the measurement are processed conventionally to yield a measurement of the sections that produce fringes. In the sections where no fringes are produced, the irradiance detected during the scan, which is generated mostly by the side illumination, is processed using a non-interferometric method to yield a measurement of the sections where no fringes are produced. The result is a complete profilometric measurement of the sample surface with a single scan to include sections of high slope and roughness as well as the lower slope and smoother sections suitable for scanning interferometric measurements.

According to another benefit of the invention, by increasing sample illumination from the sides, the structural features of the sample become markedly more visible than when illuminated only by the object beam of the interferometer. As a result, the process of finding focus is greatly simplified because the focal position is rendered much more readily visible, either manually or through data processing, by the greater contrast produced by the side illumination. Furthermore, side illumination and the resulting clearer imaging of surface structures also greatly facilitate the process of identifying the regions of interest on the sample surface, an aspect of optical profilometry that is problematic when a surface with relatively low reflectivity and with some roughness is illuminated only by the object beam of the interferometer.

The invention is preferably implemented by providing multiple light sources mounted on a ring placed around the interferometric objective and adapted to illuminate the sample at various angles and from selected directions in relation to the sample. The light sources are also preferably capable of providing white light as well as selected wavelengths that may best suit the illumination of the sample at hand for optimal visibility and contrast measurements. It may also be desirable to use light sources capable of producing polarized light in order to reduce glare on reflection from the sample object. A diffuser may also be placed in front of the light source to produce more diffusive and uniform illumination.

Various other advantages of the invention will become clear from its description in the specification that follows and from the novel features particularly pointed out in the appended claims. Therefore, to the accomplishment of the advantages described above, this invention consists of the features hereinafter illustrated in the drawings, fully described in the detailed description of the preferred embodiment, and particularly pointed out in the claims. However, such drawings and description disclose but a few of the various ways in which the invention may be practiced.

DETAILED DESCRIPTION OF THE PREFERRED EMBODIMENT OF THE INVENTION

The term "intensity" is sometime used in the description of the invention interchangeably with the term "irradiance," as commonly done in the art, although it is recognized that the former more precisely refers to the light emitted by a source and the latter to the light illuminating a target or detected by a detector. The term "object beam" is used to refer to the light directed to the sample surface by a coherence scanning interferometer, as opposed to the "reference beam," which is the light directed to the reference surface of the interferometer. The term "interferometric beam" is used to refer to the beam emitted by the light source of the interferometer as well as the beam resulting from interference of the object and reference beams and detected by a light sensor. The terms "depth-from-focus mapping" and "depth-from-focus maps" are used throughout to refer to any profiling technique and resulting maps, respectively, based on illuminating the object by any means, measuring the irradiance produced thereby at a detector, and deriving a corresponding map therefrom without interferometric analysis, whether or not interference effects are present in such irradiance. For example, without limitation, depth-from-focus mapping is intended to cover also so-called shape-from-focus methods, and any other profiling technique based on finding best focus for a light illuminating the object, such as confocal methods and contrast techniques, etc., as described, for example, in Said Pertuz et al., "Analysis of focus measure operators for shape-from-focus," available at http://www.sayonics.com/publications/pertuz_PR2013.pdf. With reference to portions or regions of the sample surface, the term "adjacent" is intended to refer to contiguous such portions or regions that are measured according to the invention to produce interferometric and/or depth-from-focus maps that are then merged to obtain a continuous map, whether or not such maps overlap. The term "merge" refers to any known technique (such as those normally referred to as "stitching") used to combine separate maps of a sample surface (whether obtained by the same technique or not) to produce a continuous map of the corresponding regions of interest of the surface.

The invention is described throughout for convenience with reference to a vertical scanning interferometer. However, the invention is intended to include not only coherence scanning and phase shifting interferometry, but also any method that produces interference fringes by changing the optical path length difference between an object and a reference beam, such as, for example, polarization shifting methods. Accordingly, the invention may be practiced with a conventional vertical scanning interferometer, such as shown schematically in FIG. 1 in Michelson interferometer configuration, including an additional light source for side illumination according to the invention and a computer programmed to perform the steps of the invention. The Z-scanning interferometer 10 includes an interferometric objective 12 and a sample stage 14 capable of relative translation in the X and Y plane to acquire images of a sample surface 16. The interferometer comprises a light source 18 (which can be a white light source or comprise multiple independent narrowband sources, such as R, G and B, or any other source suitable for the purposes of the invention) illuminating a reference mirror 20 and the sample surface 16 through a conventional beam splitter and the objective 12. A suitable scanning and focusing mechanism 24 (which may comprise two separate dedicated elements) is provided to place the sample surface in focus, to scan it through focus, and to track the height changes of the sample surface to keep the sample in focus for successive scans following any X-Y translation during the overall measurement. Combining the reference and object light beams generated in reflection from the mirror and the sample surface, interference fringes are produced as a result of the optical path difference between the two beams generated by the vertical scan. A detector 26 (a gray-scale or color camera, or a combination of both) and appropriate electronic components 28 are provided to acquire and transmit digitized irradiance data and for further processing by electronic apparatus, such as a computer 30 and an image display device 32. For the purposes of the present invention the interferometer is also equipped with an additional light-source element 34 for side illumination as described below. The intensity of the light sources 18 and 34 can be varied precisely by controlling the level of power input to them, either manually or automatically according to some predetermined protocol. A controller 36 is connected to the computer 30 and the scanning mechanism 24 for bringing the sample surface 16 into focus prior to the vertical scan. The controller 36 is adapted for automated operation through the computer 30 and for manual operation via a joy stick or similar device 38 in response to information displayed for a user on the monitor 32. Appropriate software is provided conventionally to enable processing according to the invention, as detailed above and below.

Figure 1:
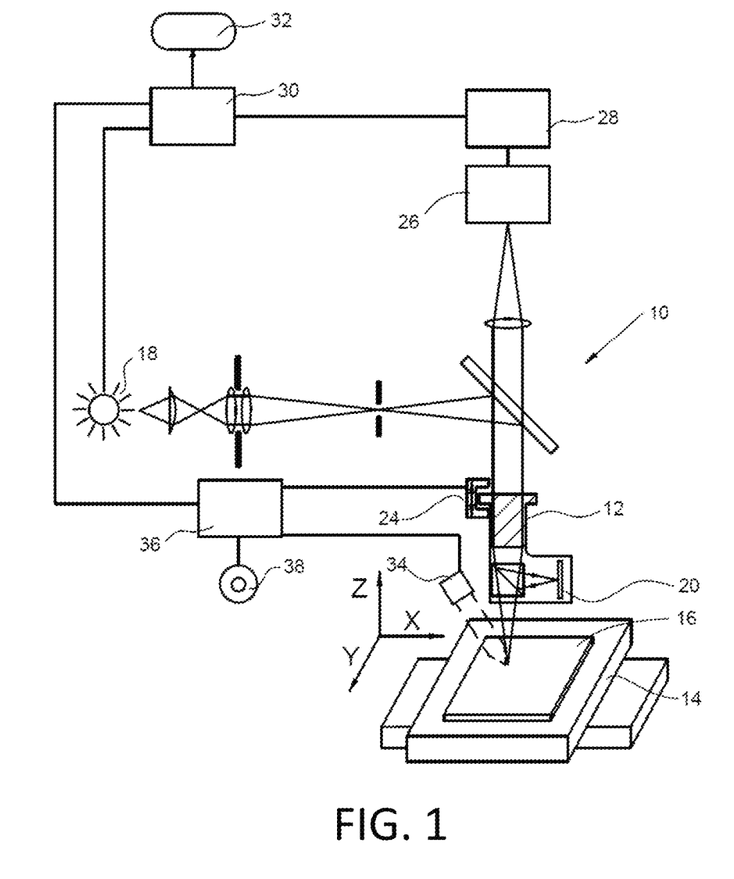
FIG. 1 is a schematic drawing of a convention vertical-scanning interferometer fitted with a side-illumination element according to the invention.
Figure 2:
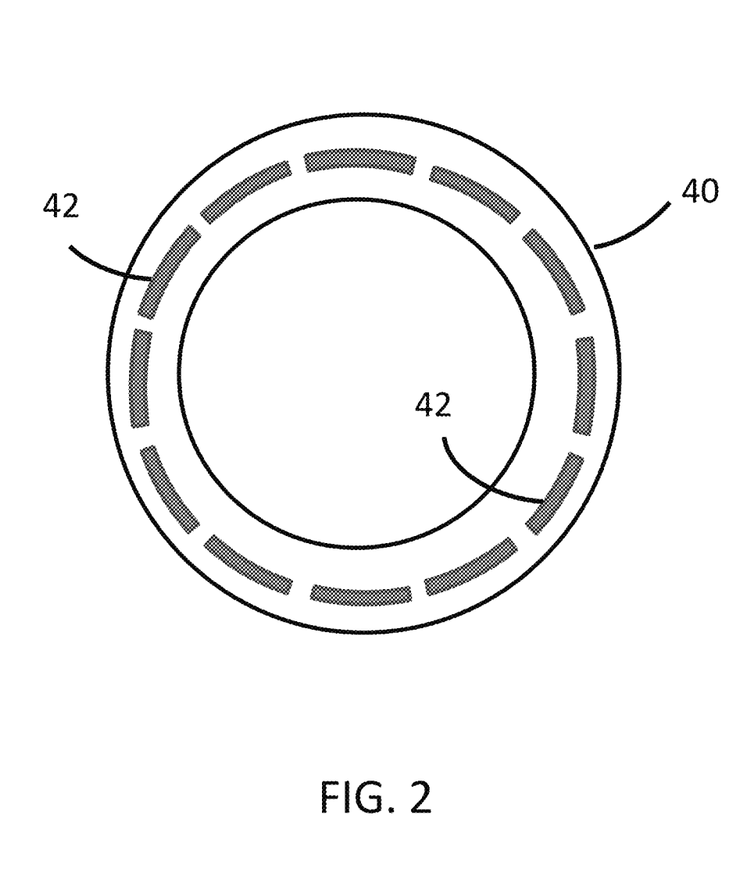
FIG. 2 is a bottom-view schematic representation of a ring-shaped side illumination element suitable for the invention.

According to the invention, the side illumination element 34 is provided to illuminate the sample surface 16 with an angle of incidence suitable for optimizing reflection of light back through the objective 12 when the slope and/or roughness of the sample reflect the object beam received from the interferometric beam L away from the objective. As shown in the exemplary schematic representation of FIG. 2, the side illumination element is preferably a ring-shaped structure 40 with a plurality of light sources 42 distributed around the ring so as to encircle the optical path of the objective 12 and provide alternative modes of illumination of the sample. Each source 42 is capable of emitting white light or a selected narrow band, such as can be achieved with RGB (red, green, blue) elements in each source, or other colors, depending on the detector, and it is tunable for various degrees of intensity of illumination. The controller 36 connected to the computer 30 is configured for enabling such different modes of illumination through conventional control hardware and computer programming. The side illumination element, in whatever configuration is chosen for a particular application, is preferably configured within the instrument so as to remain at a constant distance from the focal plane of any objective in use (such as when a multiple-objective turret is used) in order to provide constant illumination to the focal point regardless of vertical shifts of the objective (or of the sample object).

Finding Focus.

Figure 3:
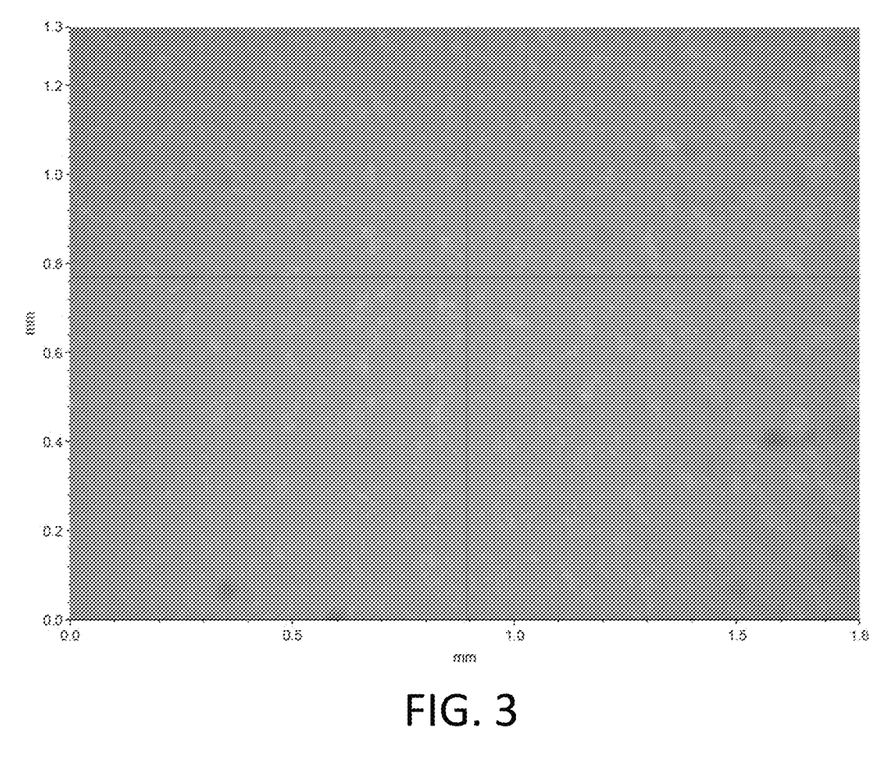
FIG. 3 illustrates the hazy image produced by a typical interferometric beam, split on a 50/50 ratio, illuminating the surface of print on paper material and a reference surface with 20 percent reflectivity.
Figure 4:
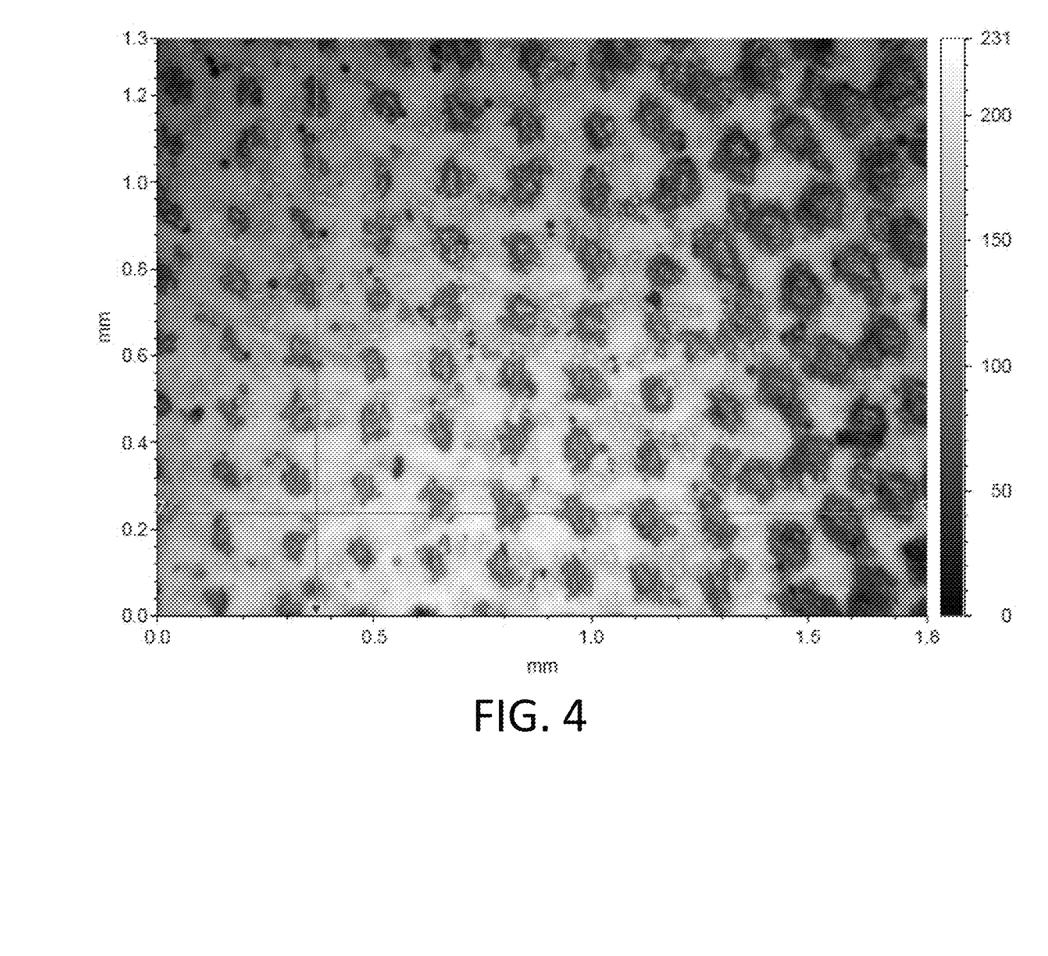
FIG. 4 illustrates the same surface of FIG. 3 when also illuminated by side illumination according to the invention.

In any scanning interferometric procedure, the first step relates to positioning the sample vertically as close as possible to the objective's focal plane. Because the depth of field is typically much greater than the range within which fringes are visible (determined by the coherence of the interferometric beam), it is useful to be able to bring the sample rapidly in focus where fringes become visible and corresponding interferograms can be recorded. If the initial focus position is not roughly known, the objective (or the sample) has to be scanned through its range at great expense of time until the in-focus position is ascertained, whether that is accomplished manually or automatically with an autofocus program. By activating a source of light from the side of the sample, the colors of the structure become much more visible and object features can be readily identified to enable the rapid positioning of the sample to be measured in focus. This advantage is illustrated in FIGS. 3 and 4 where the difference between the hazy image produced by an interferometric beam alone and the much crisper image of structural features produced by the addition of side illumination is readily apparent.

Finding the Location of Interest.

When a user is interested in measuring only a particular portion of the sample surface, the location of interest has to be positioned within the field of view of the interferometer. This process is often difficult manually, if not impossible, because the reference beam, which is reflected from a perfectly smooth surface, overshadows the object beam and the resulting image is mostly produced by the reference mirror. Therefore, the surface features of the object are not visible and the location of interest cannot be found. This problem is further exacerbated by the relative absence of color resulting from the fact that much of the contribution of the light received at the detector derives essentially from the colorless and uniformly hazy reference beam (produced by reflection from a shiny mirror).

Once the sample is brought substantially in focus with the help of side illumination, the colors and features of the sample structure become much more visible and enable the rapid X,Y positioning of the location of interest in the sample to be measured within the field of view of the objective. This operational property is particularly useful in applications where the interest is not in measuring the sample in its entirety but only where particular features are present, such as where defects are identified and need to be measured for quality control purposes. In such cases, the ability to rapidly find such structural features in the sample object is critical for an efficient operation, but it has been a problem in the past when the sample is measured interferometrically. The combination of side illumination with an interferometric objective provides a valuable improvement for addressing this problem.

Scanning the Sample Surface.

Once the location of interest has been found within the field of view of the interferometric objective, the object is scanned in conventional manner to acquire interferometric data where fringes are produced. According to the invention, side illumination is added to the object beam impinging on the sample. Since such side-illumination beam does not interfere with the interferometric beam, the presence of side illumination does not affect the interferometric scan and correlograms are recorded conventionally with the added DC contribution of the side illumination beam where fringes are produced. However, if fringes are not produced, such as where the slope or roughness of the sample surface directs the object beam away from the objective, then sufficient light from the side illumination is detected on reflection from the object to provide data for mapping the surface with a depth-from-focus mapping method of analysis. Thus, a single scan advantageously provides all information necessary for mapping the entire surface.

Figure 5:
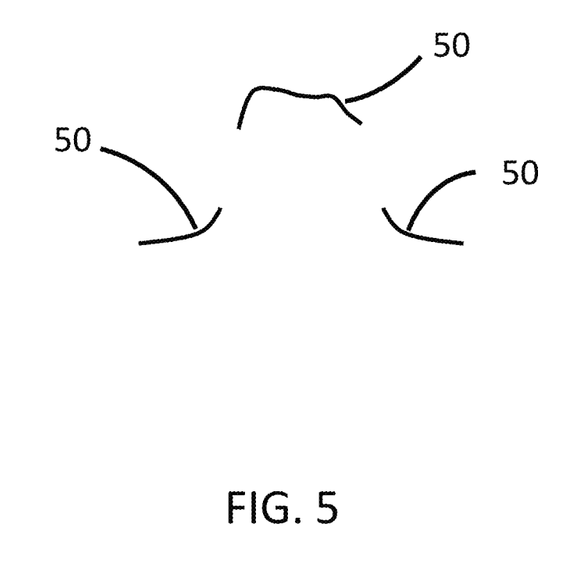
FIG. 5 illustrates a scanning interferometric measurement of a surface exhibiting areas of high slopes, such as a bell-shaped structure.

FIG. 5 illustrates the advantages of the invention taking, for example, the interferometric measurement of a bell-shaped structure. As is well understood in the art, interference fringes are not produced in areas of high slope in such sample surface. Therefore, the typical interferometric measurement will yield data only from portions of the surface that produce sufficient reflection of the object beam toward the objective, such as indicated by corresponding measured profiles 50 in the figure. The remaining portions will not produce fringes and, therefore, cannot be measured interferometrically without manipulating the sample to change its slope relative to the objective (which has been the prior-art approach).

Figure 6:
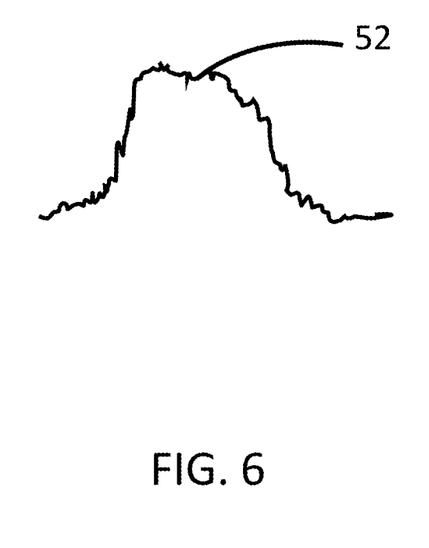
FIG. 6 illustrates the local contrast measurement of the surface of FIG. 3.
Figure 7:
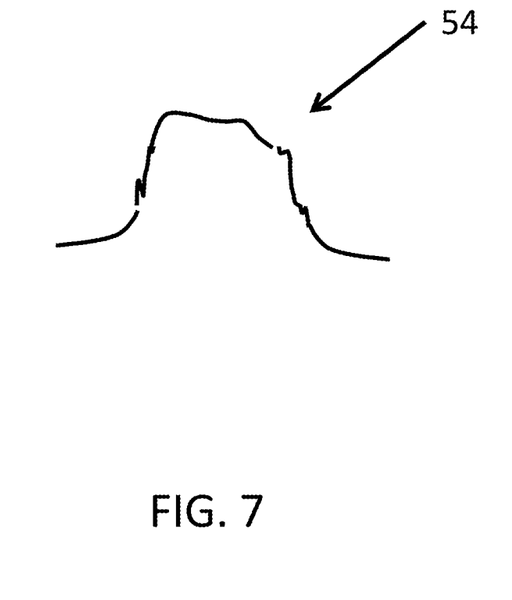
FIG. 7 illustrates a combination of the measurements of FIGS. 5 and 6 produced with a single scan according to the invention.

However, according to the invention, side illumination will produce sufficient irradiance data throughout the scan to measure the sample within the whole field of view, including from the surface areas where no correlograms are recorded by the interferometric measurement. Therefore, these portions of the surface can be profiled using depth-from-focus mapping techniques. FIG. 6 illustrates the type of profile 52 produced by a local contrast technique where contrast is measured as the irradiance difference between a number of neighboring pixels (7×7 in the example). As shown in FIG. 7, the combination of the two measurements provides a complete profile 54 of the sample surface. While depth-from-focus mapping techniques are not as precise as interferometric methods, the ability to provide a complete profile with a single scan of data acquisition is a very valuable feature heretofore absent in scanning interferometry.

Those skilled in the art will recognize that depth-from-focus mapping can also be practiced on the irradiance signal when fringes are present by various conventional methods, such as by local contrast on the entire signal or by filtering the signal and operating only on the DC portion of the signal. Thus, in the regions where fringes are present, two maps can be calculated (one interferometrically, the other by depth-from-focus mapping) and the offset between these two maps can be used advantageously to align vertically the interferometric maps of the regions with fringes with the depth-from-focus maps of the regions without fringes. This technique is very useful for merging the various portions of the profile together, especially when fringes are created slightly off from the best focus of the objective.

It is understood that during the scan the side illumination could be activated automatically only when no fringes are detected according to some predetermined threshold. Another option could be to synchronize the object illumination with camera frames alternating between interferometric illumination only and side illumination only (in some optimal manner, which could be switching at every frame, for instance). As another option, if the object illumination is alternated between an interferometric beam and a bright-field beam (for depth-from-focus mapping), the bright-field beam could be produced with the interferometric beam by blocking the reference beam. This could be achieved, for example, with a reference mirror made of a micro-mirror array (such as used in digital light projection), or with the use of spatial light modulators in front of the reference mirror to block reflected light in synchrony with the camera. However, while this approach would improve the imaging produced with the interferometric beam alone, it would not improve materially depth-from-focus mapping when the sample is such that the light is directed away from the objective; therefore, the use of side illumination is very much preferred.

The direction of the side-illumination light emitted by the source 34 could be changed during the scan to optimize its angle of incidence on the varying slope of the sample surface to maximize reflection toward the objective. Similarly, only light from predetermined alternative sources 42 could be used and activated as needed during the scan. Different wavelengths could also be used to improve visibility depending on the color and nature of the sample surface. Similarly, on the imaging path of the interferometer, the beam could be split into two beams directed to two separate cameras, one color and the other monochrome, which would be particularly useful, respectively, to produce good color images and metrology maps of the highest level of accuracy.

With respect to the intensity of the beams, it is understood that they can be controlled either manually or automatically in conventional manner during the scan. Ideally, the intensity of the interferometric beam is set just below detector saturation once focus is found and then the side-illumination beam is activated for the scan using the appropriate type of illumination and making sure that the combined irradiance does not saturate the detector at any time. This can be done with appropriate software implemented through the computer 30 and controller 36 of the system.

Thus, a new approach to scanning interferometry has been disclosed that facilitates the process of finding focus and the location of interest within a sample surface and enables the more complete measurement of the surface regardless of local slope and roughness. These advantages are obtained with a single scan and a single step of data acquisition, with no more time or hardware requirements than for conventional interferometry other than the addition of a side illumination source 34 and of conventional depth-from-focus mapping modules in the instrument processor 30.

While the invention has been shown and described herein in what is believed to be the most practical and preferred embodiments, it is recognized that departures can be made therefrom within the scope of the invention. Therefore, the invention is not to be limited to the details disclosed herein but is to be accorded the full scope of the claims so as to embrace any and all equivalent processes and products.

The invention claimed is:

1. An optical profilometric method for measuring a sample surface with a single data acquisition scan when local conditions of the surface prevent the formation of interferometric correlograms on portions of the surface, the method comprising the following steps:
    providing a scanning interferometer configured to split an interferometric beam into an object beam and a reference beam, said interferometer including a source of side illumination;
    scanning the sample surface through focus while illuminating the sample surface with said object beam and a side illumination beam;
    acquiring irradiance data produced by said side illumination beam and by interference of the object beam with the reference beam during the scanning step; and
    processing said irradiance data with an interferometric technique where said data contain correlogram information and with a depth-from-focus mapping technique where the data do not contain correlogram information;
    wherein said processing step comprises deriving interferometric maps and depth-from-focus maps of corresponding adjacent portions of said surface and merging said interferometric maps and contrast maps to produce a continuous map of said adjacent portions of the surface, and further comprises processing said irradiance data with a depth-from-focus mapping technique also where the data contain correlogram information to derive corresponding depth-from-focus secondary maps, and then utilizing an offset between said depth-from-focus maps and said depth-from-focus secondary maps to align vertically the interferometric maps and the depth-from-focus maps.

2. An optical profilometric method for measuring a sample surface with a single data acquisition scan when local conditions of the surface prevent the formation of interferometric correlograms on portions of the surface, the method comprising the following steps:
    providing a scanning interferometer configured to split an interferometric beam into an object beam and a reference beam, said interferometer including a source of side illumination;
    illuminating the sample surface with said source of side illumination and placing the surface in focus using surface features rendered visible by the said side illumination;
    scanning the sample surface through focus while illuminating the sample surface with said object beam and a side illumination beam;
    acquiring irradiance data produced by said side illumination beam and by interference of the object beam with the reference beam during the scanning step; and
    processing said irradiance data with an interferometric technique where said data contain correlogram information and with a depth-from-focus mapping technique where the data do not contain correlogram information.

3. The method of claim 2, wherein said processing step further comprises deriving interferometric maps and depth-from-focus maps of corresponding adjacent portions of said surface and merging said interferometric maps and depth-from-focus maps to produce a continuous map of said adjacent portions of the surface.

4. The method of claim 3, wherein said processing step further includes processing said irradiance data with a depth-from-focus mapping technique also where the data contain correlogram information to derive corresponding depth-from-focus secondary maps, and then utilizing an offset between said depth-from-focus maps and said depth-from-focus secondary maps to align vertically the interferometric maps and the depth-from-focus maps.

5. The method of claim 2, further comprising the step of finding a location of interest on the sample surface using said surface features rendered visible by the side illumination after the step of placing the surface in focus.

6. The method of claim 5, wherein said processing step further comprises deriving interferometric maps and depth-from-focus maps of corresponding adjacent portions of said surface and merging said interferometric maps and depth-from-focus maps to produce a continuous map of said adjacent portions of the surface.

7. The method of claim 6, wherein said processing step further includes processing said irradiance data with a depth-from-focus mapping technique also where the data contain correlogram information to derive corresponding depth-from-focus secondary maps, and then utilizing an offset between said depth-from-focus maps and said depth-from-focus secondary maps to align vertically the interferometric maps and the depth-from-focus maps.

8. A non-transitory computer program product encoded in an information storage medium and usable with a programmable computer processor coupled to a scanning interferometer including a source of side illumination and configured to split an interferometric beam into an object beam and a reference beam, said computer program product being programmed to scan a sample surface through focus while illuminating the sample surface with said object beam and a side illumination beam; to acquire irradiance data produced by said side illumination beam and by interference of the object beam with the reference beam during the scanning step; to process said irradiance data with an interferometric technique where said data contain correlogram information and with a depth-from-focus mapping technique where the data do not contain correlogram information; to derive interferometric maps and depth-from-focus maps of corresponding adjacent portions of said surface and to merge said interferometric maps and depth-from-focus maps to produce a continuous map of said adjacent portions of the surface; to process said irradiance data with a depth-from-focus mapping technique also where the data contain correlogram information to derive corresponding depth-from-focus secondary maps; and then to utilize an offset between said depth-from-focus maps and said depth-from-focus secondary maps to align vertically the interferometric maps and the depth-from-focus maps.

* * * * *